(12) United States Patent
Cheng et al.

(10) Patent No.: US 7,933,269 B2
(45) Date of Patent: *Apr. 26, 2011

(54) HARDWARE-ACCELERATED PACKET MULTICASTING IN A VIRTUAL ROUTING SYSTEM

(75) Inventors: Joseph Cheng, Sunnyvale, CA (US); Zahid Hussain, San Jose, CA (US); Tim Millet, Mountain View, CA (US)

(73) Assignee: Fortinet, Inc., Sunnyvale, CA (US)

( * ) Notice: Subject to any disclaimer, the term of this patent is extended or adjusted under 35 U.S.C. 154(b) by 484 days.

This patent is subject to a terminal disclaimer.

(21) Appl. No.: 11/849,352

(22) Filed: Sep. 3, 2007

(65) Prior Publication Data
US 2007/0291755 A1 Dec. 20, 2007

Related U.S. Application Data

(63) Continuation of application No. 10/298,815, filed on Nov. 18, 2002, now Pat. No. 7,266,120.

(51) Int. Cl.
  *H04L 12/28* (2006.01)
  *H04L 12/56* (2006.01)
  *G06F 15/173* (2006.01)
(52) U.S. Cl. ........ 370/390; 370/256; 370/389; 370/392; 370/395.43; 370/469; 709/238; 709/241; 709/245
(58) Field of Classification Search .......... 370/235–503; 709/203–247
See application file for complete search history.

(56) References Cited

U.S. PATENT DOCUMENTS

| | | | |
|---|---|---|---|
| 4,590,468 A | 5/1986 | Stieglitz | |
| 5,371,852 A | 12/1994 | Attanasion et al. | |
| 5,550,816 A | 8/1996 | Hardwick et al. | |
| 5,825,772 A | 10/1998 | Dobbins et al. | |
| 5,892,924 A * | 4/1999 | Lyon et al. | 709/245 |
| 5,920,705 A * | 7/1999 | Lyon et al. | 709/240 |
| 5,964,847 A | 10/1999 | Booth et al. | |
| 6,014,669 A | 1/2000 | Slaughter et al. | |
| 6,108,699 A | 8/2000 | Moiin | |
| 6,246,682 B1 | 6/2001 | Roy et al. | |
| 6,256,295 B1 * | 7/2001 | Callon | 370/254 |
| 6,286,038 B1 | 9/2001 | Reichmeyer et al. | |

(Continued)

OTHER PUBLICATIONS

Non-Final Office Action for U.S. Appl. No. 09/952,520, dated May 30, 2008.

(Continued)

*Primary Examiner* — Ayaz R Sheikh
*Assistant Examiner* — Venkatesh Haliyur
(74) *Attorney, Agent, or Firm* — Hamilton, DeSanctis & Cha LLP

(57) ABSTRACT

Methods and systems are provided for hardware-accelerated packet multicasting in a virtual routing system. According to one embodiment, a multicast packet is received at an ingress system of a packet-forwarding engine (PFE). The ingress system identifies flow classification indices for the multicast packet. Then, for each instance of multicasting, the ingress system sends a single copy of the multicast packet and the flow classification indices to an egress system of the PFE. The single copy of the multicast packet is buffered in a memory accessible by the egress system. The egress system prepares the multicast packet for transmission by for each flow classification index, identifying corresponding transform control instructions based on the flow classification index, reading the single copy of the multicast packet from the memory, causing the multicast packet to be transformed in accordance with the identified transform control instructions and outputting the transformed multicast packet.

18 Claims, 6 Drawing Sheets

U.S. PATENT DOCUMENTS

| | | | |
|---|---|---|---|
| 6,343,083 B1 | 1/2002 | Mendelson et al. | |
| 6,438,612 B1 | 8/2002 | Ylonen et al. | |
| 6,453,406 B1 | 9/2002 | Sarnikowski et al. | |
| 6,493,349 B1 | 12/2002 | Casey | |
| 6,496,935 B1 | 12/2002 | Fink et al. | |
| 6,542,502 B1 | 4/2003 | Herring et al. | |
| 6,542,515 B1 | 4/2003 | Kumar et al. | |
| 6,553,423 B1 | 4/2003 | Chen | |
| 6,609,153 B1 | 8/2003 | Salkewicz | |
| 6,611,498 B1 | 8/2003 | Baker et al. | |
| 6,611,522 B1 * | 8/2003 | Zheng et al. | 370/395.21 |
| 6,633,571 B1 | 10/2003 | Sakamoto et al. | |
| 6,640,248 B1 | 10/2003 | Jorgensen | |
| 6,654,787 B1 | 11/2003 | Aronson et al. | |
| 6,668,282 B1 | 12/2003 | Booth et al. | |
| 6,680,922 B1 | 1/2004 | Jorgensen | |
| 6,694,437 B1 | 2/2004 | Pao et al. | |
| 6,732,314 B1 | 5/2004 | Borella et al. | |
| 6,738,821 B1 | 5/2004 | Wilson et al. | |
| 6,763,236 B2 | 7/2004 | Siren | |
| 6,769,124 B1 | 7/2004 | Schoening et al. | |
| 6,775,284 B1 | 8/2004 | Calvignac et al. | |
| 6,778,502 B2 | 8/2004 | Ricciulli | |
| 6,785,224 B2 | 8/2004 | Uematsu et al. | |
| 6,807,181 B1 | 10/2004 | Weschler | |
| 6,816,462 B1 | 11/2004 | Booth et al. | |
| 6,820,210 B1 | 11/2004 | Daruwalla et al. | |
| 6,822,958 B1 | 11/2004 | Branth et al. | |
| 6,894,994 B1 | 5/2005 | Grob et al. | |
| 6,907,039 B2 | 6/2005 | Shen | |
| 6,920,146 B1 | 7/2005 | Johnson et al. | |
| 6,922,774 B2 | 7/2005 | Meushaw et al. | |
| 6,982,987 B2 | 1/2006 | Asayesh | |
| 6,985,956 B2 * | 1/2006 | Luke et al. | 709/229 |
| 6,990,103 B1 | 1/2006 | Gollamundi | |
| 7,020,143 B2 | 3/2006 | Zdan | |
| 7,028,333 B2 | 4/2006 | Tuomenoksa et al. | |
| 7,042,843 B2 | 5/2006 | Ni | |
| 7,054,311 B2 * | 5/2006 | Norman et al. | 370/378 |
| 7,062,642 B1 | 6/2006 | Langrind et al. | |
| 7,082,477 B1 | 7/2006 | Sadhasivam et al. | |
| 7,089,293 B2 * | 8/2006 | Grosner et al. | 709/217 |
| 7,096,383 B2 * | 8/2006 | Talaugon et al. | 714/21 |
| 7,096,495 B1 | 8/2006 | Warrier et al. | |
| 7,111,072 B1 | 9/2006 | Matthews | |
| 7,116,665 B2 | 10/2006 | Balay | |
| 7,159,031 B1 | 1/2007 | Larkin et al. | |
| 7,161,904 B2 * | 1/2007 | Hussain et al. | 370/230 |
| 7,174,372 B1 | 2/2007 | Sarkar | |
| 7,177,311 B1 * | 2/2007 | Hussain et al. | 370/392 |
| 7,181,547 B1 | 2/2007 | Millet | |
| 7,181,766 B2 | 2/2007 | Bendinelli et al. | |
| 7,187,676 B2 | 3/2007 | DiMambro | |
| 7,203,192 B2 | 4/2007 | Desai | |
| 7,221,945 B2 | 5/2007 | Milford et al. | |
| 7,225,259 B2 | 5/2007 | Ho et al. | |
| 7,263,106 B2 | 8/2007 | Matthews | |
| 7,266,120 B2 * | 9/2007 | Cheng et al. | 370/390 |
| 7,272,643 B1 | 9/2007 | Sarkar | |
| 7,278,055 B2 | 10/2007 | Talaugon | |
| 7,313,614 B2 * | 12/2007 | Considine et al. | 709/223 |
| 7,316,029 B1 | 1/2008 | Parker et al. | |
| 7,324,489 B1 | 1/2008 | Iyer | |
| 7,337,221 B2 | 2/2008 | Radi et al. | |
| 7,340,535 B1 * | 3/2008 | Alam | 709/246 |
| 7,376,125 B1 * | 5/2008 | Hussain et al. | 370/352 |
| 7,376,827 B1 | 5/2008 | Jiao | |
| 7,386,010 B2 | 6/2008 | Solomon et al. | |
| 7,389,358 B1 | 6/2008 | Matthews | |
| 7,499,398 B2 | 3/2009 | Damon et al. | |
| 7,522,604 B2 * | 4/2009 | Hussain et al. | 370/392 |
| 7,668,087 B2 * | 2/2010 | Hussain et al. | 370/230 |
| 7,720,053 B2 * | 5/2010 | Hussain et al. | 370/386 |
| 2001/0024425 A1 | 9/2001 | Tsunoda et al. | |
| 2001/0028636 A1 | 10/2001 | Skog et al. | |
| 2002/0071389 A1 | 6/2002 | Seo | |
| 2002/0150093 A1 | 10/2002 | Ott et al. | |
| 2002/0152373 A1 | 10/2002 | Sun | |
| 2002/0162025 A1 | 10/2002 | Sutton et al. | |
| 2002/0186667 A1 | 12/2002 | Mor et al. | |
| 2003/0012209 A1 | 1/2003 | Abdelilah et al. | |
| 2003/0033401 A1 | 2/2003 | Poisson et al. | |
| 2003/0055920 A1 | 3/2003 | Kakadia et al. | |
| 2003/0063590 A1 | 4/2003 | Mohan et al. | |
| 2003/0112799 A1 | 6/2003 | Chandra et al. | |
| 2003/0174650 A1 | 9/2003 | Shankar et al. | |
| 2003/0185221 A1 | 10/2003 | Deikman et al. | |
| 2003/0223361 A1 * | 12/2003 | Hussain et al. | 370/230 |
| 2004/0006601 A1 | 1/2004 | Bernstein et al. | |
| 2004/0019651 A1 | 1/2004 | Andaker | |
| 2004/0054886 A1 | 3/2004 | Dickinson et al. | |
| 2004/0078772 A1 | 4/2004 | Balay | |
| 2004/0095932 A1 | 5/2004 | Astarabadi et al. | |
| 2004/0095934 A1 * | 5/2004 | Cheng et al. | 370/390 |
| 2004/0160900 A1 | 8/2004 | Lund et al. | |
| 2004/0193922 A1 | 9/2004 | Bandini et al. | |
| 2004/0199567 A1 | 10/2004 | Lund | |
| 2004/0199568 A1 | 10/2004 | Lund | |
| 2004/0199569 A1 | 10/2004 | Kalkunte et al. | |
| 2005/0047407 A1 | 3/2005 | Desai | |
| 2005/0081059 A1 | 4/2005 | Bandini et al. | |
| 2005/0163115 A1 | 7/2005 | Dontu et al. | |
| 2005/0213589 A1 | 9/2005 | Shih | |
| 2006/0087969 A1 | 4/2006 | Santiago et al. | |
| 2006/0265519 A1 | 11/2006 | Millet | |
| 2007/0058648 A1 | 3/2007 | Millet | |
| 2007/0064704 A1 | 3/2007 | Balay | |
| 2007/0073733 A1 | 3/2007 | Matthews | |
| 2007/0083528 A1 | 4/2007 | Matthews | |
| 2007/0104119 A1 | 5/2007 | Sarkar | |
| 2007/0109968 A1 * | 5/2007 | Hussain et al. | 370/232 |
| 2007/0110062 A1 * | 5/2007 | Balay et al. | 370/390 |
| 2007/0115979 A1 | 5/2007 | Balay | |
| 2007/0121579 A1 | 5/2007 | Matthews | |
| 2007/0127382 A1 * | 6/2007 | Hussain et al. | 370/235 |
| 2007/0147368 A1 | 6/2007 | Desai | |
| 2007/0237172 A1 | 10/2007 | Zelig et al. | |
| 2007/0291755 A1 * | 12/2007 | Cheng et al. | 370/390 |
| 2008/0013470 A1 | 1/2008 | Kopplin | |
| 2008/0016389 A1 | 1/2008 | Talaugon | |
| 2008/0117917 A1 | 5/2008 | Balay | |
| 2008/0259936 A1 * | 10/2008 | Hussain et al. | 370/397 |
| 2008/0317040 A1 | 12/2008 | Balay | |
| 2008/0317231 A1 | 12/2008 | Balay | |
| 2008/0320553 A1 | 12/2008 | Balay | |
| 2009/0007228 A1 | 1/2009 | Balay | |
| 2009/0046728 A1 | 2/2009 | Matthews | |
| 2009/0073977 A1 * | 3/2009 | Hussain et al. | 370/389 |
| 2009/0225759 A1 * | 9/2009 | Hussain et al. | 370/395.1 |

OTHER PUBLICATIONS

Advisory Action for U.S. Appl. No. 09/663,483, dated Apr. 11, 2008.
Fowler, D., "VPNs Become a Virtual Reality." Netnews, Apr./May 1998. pp. 1-4.
Non-Final Office Office for U.S. Appl. No. 11/671,462, mailed Oct. 8, 2008.
Restriction Requirement for U.S. Appl. No. 10/949,943, mailed Oct. 20, 2008.
Lawrence, J. Lang et al."Connecting Remote FDDI Installations with Single-Mode Fiber, Dedicated Lines, or SMDS." Jul. 1990; ACM SIGCOMM Computer Communication Review. vol. 20, Issue 3; pp. 72-82.
IEEE Potentials Publication; "Local Area Networks" Dec. 95/Jan. 96; pp. 6. http://www.ece.uc.edu/-paw/potentials/sample.
Office Action dated Oct. 18, 2007 for U.S. Appl. No. 09/663,483.
Office Action dated Oct. 16, 2007 for U.S. Appl. No. 09/661,130.
Office Action dated Nov. 28, 2007 for U.S. Appl. No. 09/952,520.
Non-Final Office Action for U.S. Appl. No. 10/991,969 mailed Apr. 27, 2009.
Non-Final Office Action for U.S. Appl. No. 11/684,614 mailed Apr. 24, 2009.
Office Action dated Aug. 1, 2007 for U.S. Appl. No. 10/163,260.
Amendment and Response filed on May 23, 2007 for U.S. Appl. No. 10/163,260.

Office Action dated Apr. 13, 2007 for U.S. Appl. No. 10/163,260.
Amendment and Response filed on Mar. 13, 2007 for U.S. Appl. No. 10/163,260.
Office Action dated Dec. 21, 2006 for U.S. Appl. No. 10/163,260.
Amendment and Response filed on Sep. 18, 2006 for U.S. Appl. No. 10/163,260.
Office Action dated May 18, 2006 for U.S. Appl. No. 10/163,260.
Office Action dated Aug. 22, 2007 for U.S. Appl. No. 10/650,298.
Response to Restriction Requirement Apr. 26, 2004 for U.S. Appl. No. 09/663,483.
Restriction Requirement dated Mar. 22, 2004 for U.S. Appl. No. 09/663,483.
Office Action dated Sep. 11, 2007 for U.S. Appl. No. 09/661,637.
Amendment and Response filed on Jun. 20, 2007 for U.S. Appl. No. 09/661,637.
Office Action dated Feb. 8, 2007 for U.S. Appl. No. 09/661,637.
Amendment and Response filed on Mar. 6, 2006 for U.S. Appl. No. 09/661,637.
Office Action dated Dec. 23, 2004 for U.S. Appl. No. 09/661,637.
Amendment and Response filed on Aug. 5, 2004 for U.S. Appl. No. 09/661,637.
Office Action dated May 5, 2004 for U.S. Appl. No. 09/661,637.
Supplemental Amendment and Response filed on Sep. 17, 2007, 2007 for U.S. Appl. No. 09/663,457.
Notice of Allowance dated Dec. 1, 2004 for U.S. Appl. No. 09/661,636.
Amendment and Response filed on Sep. 2, 2004 for U.S. Appl. No. 09/661,636.
Office Action dated May 28, 2004 for U.S. Appl. No. 09/661,636.
Amendment and Response filed on Mar. 22, 2004 for U.S. Appl. No. 09/661,636.
Office Action dated Nov. 18, 2003 U.S. Appl. No. 09/661,636.
Amendment and Response filed on Apr. 29, 2007 for U.S. Appl. No. 09/661,130.
Office Action dated Dec. 28, 2006 for U.S. Appl. No. 09/661,130.
Amendment and Response filed on Mar. 6, 2006 for U.S. Appl. No. 09/661,130.
Office Action dated Oct. 18, 2004 for U.S. Appl. No. 09/661,130.
Amendment and Response filed on Apr. 9, 2004 for U.S. Appl. No. 09/661,130.
Office Action dated Nov. 5, 2003 for U.S. Appl. No. 09/661,130.
Notice of Allowance dated Jun. 14, 2007 for U.S. Appl. No. 10/067,106.
Amendment and Response filed on Mar. 10, 2007 for U.S. Appl. No. 10/067,106.
Office Action dated Nov. 16, 2006 for U.S. Appl. No. 10/067,106.
Amendment and Response filed on Aug. 28, 2006 for U.S. Appl. No. 10/067,106.
Office Action dated Mar. 27, 2006 for U.S. Appl. No. 10/067,106.
Amendment and Response filed on Nov. 6, 2006 for U.S. Appl. No. 09/663,483.
Office Action dated Jul. 6, 2006 for U.S. Appl. No. 09/663,483.
Amendment and Response filed on Mar. 13, 2006 for U.S. Appl. No. 09/663,483.
Advisory Action dated Nov. 12, 2004 for U.S. Appl. No. 09/663,483.
Amendment and Response filed on Oct. 8, 2004 for U.S. Appl. No. 09/663,483.
Office Action dated Jun. 3, 2004 for U.S. Appl. No. 09/663,483.
Amendment and Response filed on Feb. 26, 2004 for U.S. Appl. No. 09/663,483.
Office Action dated Aug. 21, 2003 for U.S. Appl. No. 09/663,483.
Amendment and Response filed on Mar. 13, 2006 for U.S. Appl. No. 09/952,520.
Office Action dated Mar. 14, 2005 for U.S. Appl. No. 09/952,520.
Notice of Allowance dated Jul. 30, 2007 for U.S. Appl. No. 09/663,485.
Amendment and Response filed on Jun. 11, 2007 for U.S. Appl. No. 09/663,485.
Office Action dated Jan. 11, 2007 for U.S. Appl. No. 09/663,485.
Amendment and Response filed on Aug. 28, 2006 for U.S. Appl. No. 09/663,485.
Office Action dated Jul. 26, 2007 for U.S. Appl. No. 09/663,485.
Amendment and Response filed on Feb. 2, 2006 for U.S. Appl. No. 09/663,485.
Office Action dated Dec. 21, 2004 for U.S. Appl. No. 09/663,485.
Amendment and Response filed on Nov. 16, 2004 for U.S. Appl. No. 09/663,485.
Office Action dated May 14, 2004 for U.S. Appl. No. 09/663,485.
Amendment and Response filed on Mar. 15, 2004 for U.S. Appl. No. 09/663,485.
Office Action dated Sep. 8, 2003 for U.S. Appl. No. 09/663,485.
Office Action dated Aug. 8, 2007 for U.S. Appl. No. 09/663,457.
Amendment and Response filed on Jul. 11, 2007 for U.S. Appl. No. 09/663,457.
Office Action dated May 17, 2007 for U.S. Appl. No. 09/663,457.
Amendment and Response filed on Oct. 2, 2006 for U.S. Appl. No. 09/663,457.
Office Action dated Apr. 22, 2005 for U.S. Appl. No. 09/663,457.
Office Action dated Aug. 27, 2004 for U.S. Appl. No. 09/663,457.
Amendment and Response filed on Jun. 21, 2004 for U.S. Appl. No. 09/663,457.
Office Action dated Dec. 11, 2003 for U.S. Appl. No. 09/663,457.
Notice of Allowance dated Nov. 21, 2006 for U.S. Appl. No. 09/663,484.
Amendment and Response filed on Aug. 24, 2006 for U.S. Appl. No. 09/663,484.
Office Action dated Feb. 24, 2006 for U.S. Appl. No. 09/663,484.
Amendment and Response filed on Feb. 7, 2006 for U.S. Appl. No. 09/663,484.
Office Action dated Apr, 6, 2005 for U.S. Appl. No. 09/663,484.
A Lightweight Protocol for Interconnecting Heterogenous Devices in Dynamic Environments, (c) 1999, obtained from the Internet at: http//ieeexplore.ieee.org/iel5/6322/16898/00778477.pdf.
The Guide to Computing Literature, Jairo A: A Framework and Lightweight Protocol for Multimedia Network Management, vol. 8, Issue 1, published 2000, ISSN: 1064-7570.
Bookfinder4u.com: High Performance Networks By Ahmed N. Tantawy, ISBN-10: 0792393716, Published 1993, Lightweight Protocols.
Ipinfusion white paper: Virtual Routing for Provider Edge application, obtained from the Internet at: http://www.ipinfusion.com/pdf/VirtualRouting_app-note_3rev0302.pdf, pp. 1-8.
Non-Final Office Action for U.S. Appl. No. 10/991,969, dated Feb. 20, 2008.
Non-Final Office Action for U.S. Appl. No. 10/273,669, dated Feb. 20, 2008.
Non-Final Office Action for U.S. Appl. No. 10/949,943, dated Feb. 14, 2008.
Restriction Requirement for U.S. Appl. No. 11/556,697, dated Feb. 13, 2008.
Tsiang et al. "RFC 2892, The Cisco SRP MAC Layer Protocol." Aug. 2000, pp. 1-52.
Zhang et al. "Token Ring Arbitration Circuits for Dynamic Priority Algorithms" IEEE, 1995, pp. 74-77.
Non-Final Office Action for U.S. Appl. No. 11/537,609.
Non-Final Office Action for U.S. Appl. No. 11/621,102 mailed Mar. 30, 2009.
Non-Final Office Action for U.S. Appl. No. 11/616,243 mailed Mar. 3, 2009.
Final Office Action for U.S. Appl. No. 09/952,520 mailed Feb. 11, 2009.
Final Office Action for U.S. Appl. No. 09/663,457 mailed Feb. 3, 2009.
Non-Final Office Action for U.S. Appl. No. 11/530,901 mailed Jan. 26, 2009.
Non-Final Office Action for U.S. Appl. No. 11/556,697, dated Jul. 9, 2008.
Restriction Requirement for U.S. Appl. No. 10/991,970, dated Jul. 15, 2008.
Non-Final Office Action for U.S. Appl. No. 09/663,457, dated Jul. 15, 2008.
Final Office Action for U.S. Application No. 10/650,298, mailing date Sep. 3, 2008.
Final Office Action for U.S. Appl. No. 10/991,969, mailing date Sep. 22, 2008.

Amendment and Response filed on Nov. 12, 2004 for U.S. Appl. No. 09/663,484.
Office Action dated May 6, 2004 for U.S. Appl. No. 09/663,484.
Amendment and Response filed on Feb. 18, 2004 for U.S. Appl. No. 09/663,484.
Office Action dated Aug. 12, 2003 for U.S. Appl. No. 09/663,484.
Notice of Allowance dated Jan. 4, 2007 for U.S. Appl. No. 09/894,471.
Amendment and Response filed on Nov. 2, 2006 for U.S. Appl. No. 09/894,471.
Office Action dated Oct. 26, 2006 for U.S. Appl. No. 09/894,471.
Amendment and Response filed on Mar. 10, 2006 for U.S. Appl. No. 09/894,471.
Office Action dated Dec. 14, 2004 for U.S. Appl. No. 09/894,471.
Notice of Allowance dated Nov. 7, 2006 for U.S. Appl. No. 09/771,346.
Amendment and Response filed on Oct. 18, 2006 for U.S. Appl. No. 09/771,346.
Office Action dated Jul. 18, 2006 for U.S. Appl. No. 09/771,346.
Amendment and Response filed on Mar. 13, 2006 for U.S. Appl. No. 09/771,346.
Office Action dated Jan. 25, 2005 for U.S. Appl. No. 09/771,346.
Amendment and Response filed on Oct. 14, 2004 for U.S. Appl. No. 09/771,346.
Office Action dated Mar. 26, 2004 for U.S. Appl. No. 09/771,346.
Notice of Allowance dated Nov. 19, 2006 for U.S. Appl. No. 10/163,162.
Amendment and Response filed on Aug. 5, 2006 for U.S. Appl. No. 10/163,162.
Office Action dated May 5, 2006 for U.S. Appl. No. 10/163,162.
Notice of Allowance dated Jan. 4, 2007 for U.S. Appl. No. 10/163,261.
Amendment and Response filed on Nov. 9, 2006 for U.S. Appl. No. 10/163,261.
Office Action dated Nov. 3, 2006 for U.S. Appl. No. 10/163,261.
Amendment and Response filed on Aug. 22, 2006 for U.S. Appl. No. 10/163,261.
Office Action dated May 22, 2006 for U.S. Appl. No. 10/163,261.
Notice of Allowance dated Jul. 27, 2006 for U.S. Appl. No. 10/163,073.
Office Action dated May 30, 2007 for U.S. Appl. No. 10/273,669.
Amendment and Response filed on Mar. 9, 2007 for U.S. Appl. No. 10/273,669.
Office Action dated Sep. 21, 2006 for U.S. Appl. No. 10/273,669.
Amendment and Response filed on Jun. 21, 2006 for U.S. Appl. No. 10/273,669.
Office Action dated Feb. 21, 2006 for U.S. Appl. No. 10/273,669.
Notice of Allowance dated Aug. 14, 2007 for U.S. Appl. No. 10/163,071.
Amendment and Response filed on Jul. 17, 2007 for U.S. Appl. No. 10/163,071.
Office Action dated Jul. 3, 2007 for U.S. Appl. No. 10/163,071.
Amendment and Response filed on May 6, 2007 for U.S. Appl. No. 10/163,071.
Office Action dated Nov. 7, 2006 for U.S. Appl. No. 10/163,071.
Amendment and Response filed on Sep. 1, 2006 for U.S. Appl. No. 10/163,071.
Office Action dated Jun. 1, 2006 for U.S. Appl. No. 10/163,071.
Amendment and Response filed on Mar. 6, 2006 for U.S. Appl. No. 10/163,071.
Office Action dated Dec. 2, 2005 for U.S. Appl. No. 10/163,071.
Notice of Allowance dated Nov. 29, 2006 for U.S. Appl. No. 10/163,079.
Amendment and Response filed on Nov. 1, 2006 for U.S. Appl. No. 10/163,079.
Office Action dated Oct. 27, 2006 for U.S. Appl. No. 10/163,079.
Amendment and Response filed on Aug. 17, 2006 for U.S. Appl. No. 10/163,079.
Office Action dated May 17, 2006 for U.S. Appl. No. 10/163,079.
Notice of Allowance dated Jul. 17, 2007 for U.S. Appl. No. 10/298,815.
Amendment and Response filed on Mar. 9, 2007 for U.S. Appl. No. 10/298,815.
Office Action dated Feb. 23, 2007 for U.S. Appl. No. 10/298,815.
Notice of Allowance dated Jun. 27, 2005 for U.S. Appl. No. 10/232,979.
Notice of Allowance dated Jul. 5, 2007 for U.S. Appl. No. 11/466,098.
Amendment and Response filed on Aug. 10, 2007 for U.S. Appl. No. 10/163,260.

* cited by examiner

HARDWARE-ACCELERATED PACKET MULTICASTING IN A VIRTUAL ROUTING SYSTEM

CROSS-REFERENCE TO RELATED APPLICATIONS

This application is a continuation of U.S. application Ser. No. 10/298,815 filed on Nov. 18, 2002, now U.S. Pat. No. 7,266,120, which is hereby incorporated by reference in its entirety for all purposes. This application is also related to U.S. Pat. No. 7,177,311, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright (D 2002-2007, Fortinet, Inc.

BACKGROUND

1. Field

Embodiments of the present invention generally relate to data communications, and in particular to network routing and routing systems, and more particularly to packet multicasting.

2. Description of the Related Art

Conventional routing systems generally perform packet multicasting in a single routing context using a single multicast address space. With this approach, supporting various multicast features for different customers may require the use of a separate router for each customer. This approach may also prevent users from taking advantage of packet multicasting resources available from multiple routing contexts with private and potentially overlapping address spaces.

SUMMARY

Methods and systems are described for hardware-accelerated packet multicasting in a virtual routing system. According to one embodiment, a multicast packet is received at an ingress system of a packet-forwarding engine (PFE). The ingress system identifies flow classification indices for the multicast packet. Then, for each instance of multicasting, the ingress system sends a single copy of the multicast packet and the flow classification indices to an egress system of the PFE. The single copy of the multicast packet is buffered in a memory accessible by the egress system. The egress system prepares the multicast packet for transmission by for each flow classification index, identifying corresponding transform control instructions based on the flow classification index, reading the single copy of the multicast packet from the memory, causing the multicast packet to be transformed in accordance with the identified transform control instructions and outputting the transformed multicast packet.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
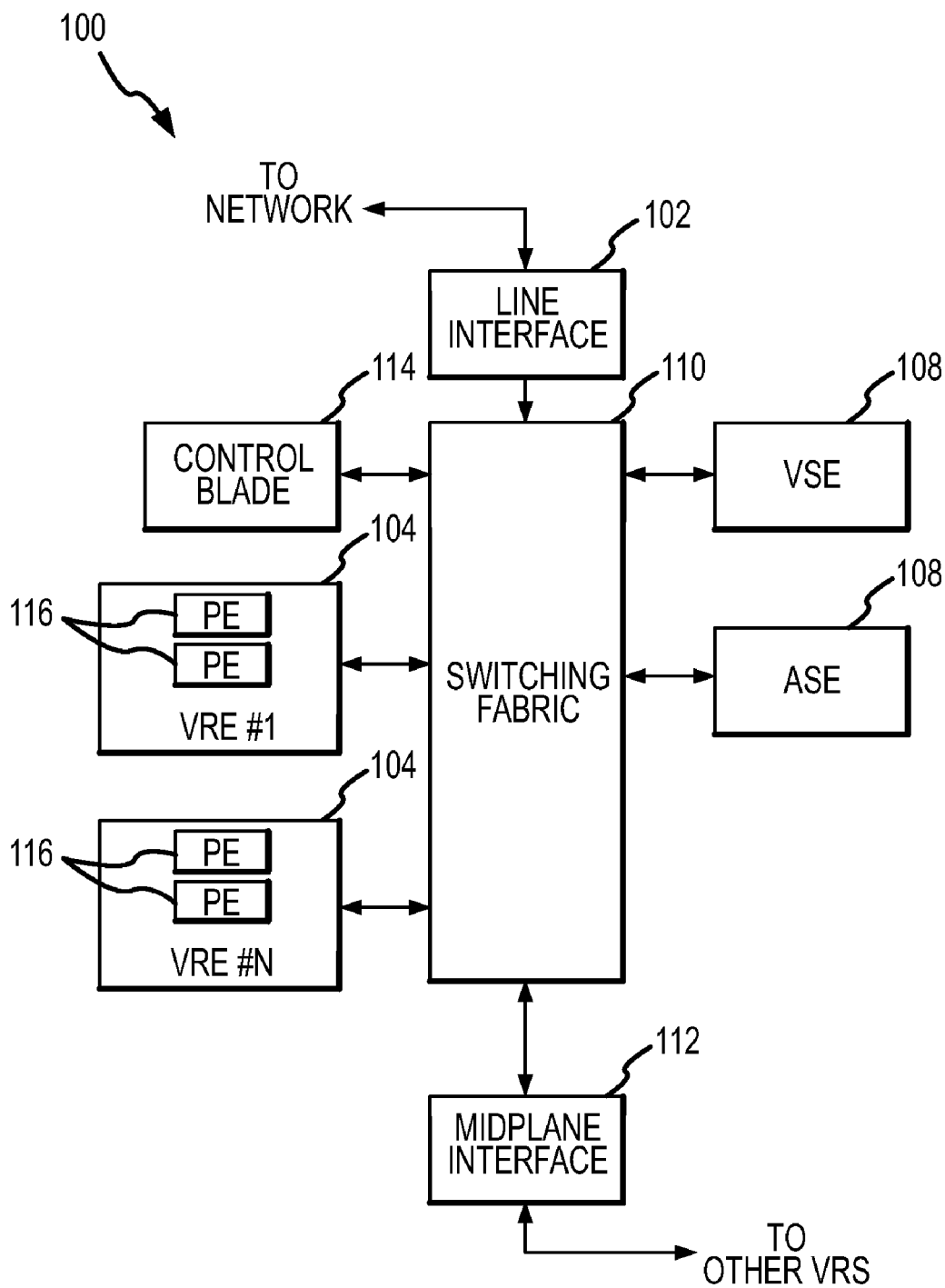
FIG. 1 is a simplified functional block diagram of a virtual routing system in accordance with an embodiment of the present invention.

Methods and systems are described for hardware-accelerated packet multicasting in a virtual routing system. In various embodiments of the present invention, virtual routing systems and methods takes advantage of multiple routing contexts thereby allowing a service provider to support multicast features for many different access clients with a single piece of hardware.

Reference is made herein to the accompanying drawings that form a part hereof, and in which is shown by way of illustration specific embodiments in which the invention may be practiced. It is to be understood that other embodiments may be utilized and structural changes may be made without departing from the scope of the present invention.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Terminology

Brief definitions of terms used throughout this application are given below.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

FIG. 1 is a simplified functional block diagram of a virtual routing system in accordance with an embodiment of the present invention. Virtual routing system 100, among other things, may provide hardware-based network processor capabilities and high-end computing techniques, such as parallel processing and pipelining. In embodiment of the present invention, virtual routing system 100 may implement one or more virtual private networks (VPNs) and one or more associated virtual routers (VRs), and in some embodiments, system 100 may implement hundreds and even thousands of VPNs and VRs. Virtual routing system 100 may include one or more line interfaces 102, one or more virtual routing engines (VREs) 104, one or more virtual service engines (VSEs) 106, and one or more advanced security engines (ASEs) 108 coupled by switching fabric 110. Virtual routing system 100 may also include interface 112 which may interface with other routing systems. Virtual routing system 100 may also include one or more control blades 114 to create VPNs and/or VRs to operate on VREs 104.

In one embodiment, several VPNs and/or VRs may, for example, run on one of processing engines (PEs) 116 of VRE 104. A VPN or VR may be a software context comprised of a set of objects that are resident in the processing engine's memory system. The software context may include the state and processes found in a conventional router, however hundreds or more of these virtual router contexts may be overlaid onto a single processing engine and associated memory system. Accordingly, one of processing engines 116 may provide the context of many VRs to be shared allowing one piece of hardware, such as virtual routing system 100, to function as up to a hundred or even a thousand or more routers.

Line interface 102 may receive packets of different packet flows from an external network over a communication channel. VREs 104 may perform packet classification, deep packet inspection, and service customization. In one embodiment, VRE 104 may support up to one million or more access control list (ACL) level packet flows. VREs 104 may include a virtual routing processor (not illustrated) to provide hardware assisted IP packet forwarding, multi-protocol label switching (MPLS), network address translation (NAT), differentiated services (DiffServ), statistics gathering, metering and marking. VREs 104 and VSEs 106 may include a virtual service controller (not illustrated) to support parallel processing and pipelining for deep packet inspection and third-party application computing. VSEs 106 may perform parallel processing and/or pipelining, and other high-end computing techniques, which may be used for third party applications such as firewall services and anti-virus services. ASEs 108 may provide for hardware and hardware assisted acceleration of security processing, including encryption/decryption acceleration for IP security protocol type (IPSec) packet flows and virtual private networks (VPNs). Switching fabric 110 may be a high-capability non-blocking switching fabric supporting rates of up to 51.2 Gbps and greater.

Line interface 102 may include a flow manager (not illustrated) to load-balance service requests to VSEs 106 and VREs 104, and may support robust priority and/or weighted round robin queuing. In one embodiment, the flow manager may provide for service load balancing and may dynamically determine one of VREs 104, which may best handle a certain packet flow. Accordingly, all packets of a particular flow may be sent to the same VRE 104. Line interface 102 may identify one of the VREs to process packets of a packet flow based on a physical interface and virtual channel from which the packets of the packet flow were received. The identified VRE may perform ingress metering, header transformation and egress metering for packets of the packet flow. In one embodiment, hardware based metering and marking using a dual token bucket scheme assists in rate-control capabilities of system 100. This may allow for granular application level support and the ability to provide strong performance based service level agreements (SLAs).

Different packets may take different paths through virtual routing system 100 and may not necessarily require the resources of all the various functional elements of virtual routing system 100. In one embodiment, a packet, such as a virtual local area network (VLAN) Ethernet packet, may arrive at an input port of line interface 102. The input port may be a gigabit Ethernet input port, which may be one of several input ports. The flow manager may program a steering table look-up to determine which VLAN is associated with a particular one of VREs 104. The flow manager may tag the packet with an internal control header and may transfer the packet from line interface 102 across switching fabric 110 to the selected VRE 104. A service controller of VRE 104 may perform deep packet classification and extract various fields on the packet header. A flow cache may be looked up to determine whether the packet should be processed in hardware or software. If the packet is to be processed in hardware, an index to the packet processing action cache may be obtained.

The packet may be deposited via a high-speed direct access memory (DMA) into the VRE's main memory. A routing processor may retrieve the packet, identify the packet processing actions and may perform actions, such as time-to-live decrementation, IP header and checksum updating, and IP forwarding patch matching. Egress statistics counters may also be updated. The packet may be forwarded to one of ASEs 108 for security operations. The packet may also be forwarded to another one of VREs 104.

Although system 100 is illustrated as having several separate functional elements, one or more of the functional elements may be combined and may be implemented by combinations of software configured elements, such as processors including digital signal processors (DSPs), and/or other hardware elements.

In accordance with embodiments of the present invention, virtual routing system 100 supports a plurality of virtual routers (VRs) instantiated by one of virtual routing engines (VRE) 104 and which may operate on PE's 116. In this embodiment, the instantiation of each VR includes an associated routing context. The virtual routing system may perform a method of multicasting packets that comprises determining one of the plurality of VRs for a packet received from a service provider for multicasting, and switching a routing context of the VRE to a routing context associated with the VR determined for received packet. At least a portion of the packet is read from one of a plurality of multicast address spaces associated with the selected VR to multicast the packet. The packet may be a first packet received from a service provider for multicasting to a first multicast destination, and when a second packet is received from the service provider for multicasting, the method may also include determining another one of the VRs for the second packet, and switching the routing context of the VRE to a routing context associated with the VR determined for the second packet. At least a portion of the second packet is read from another of the plurality of multicast address spaces associated with the VR determined for the second packet to multicast the second packet. The second packet may be forwarded to second multicast destinations.

Accordingly, multiple VRs may utilize multiple multi-cast address spaces, which may allow a service provider, such as an Internet Service Provider (ISP), to utilize system 100 simultaneously for multicasting for many different access clients (i.e., subscribers). Conventional routing systems may require a separate router for each customer or service provider.

Figure 2:
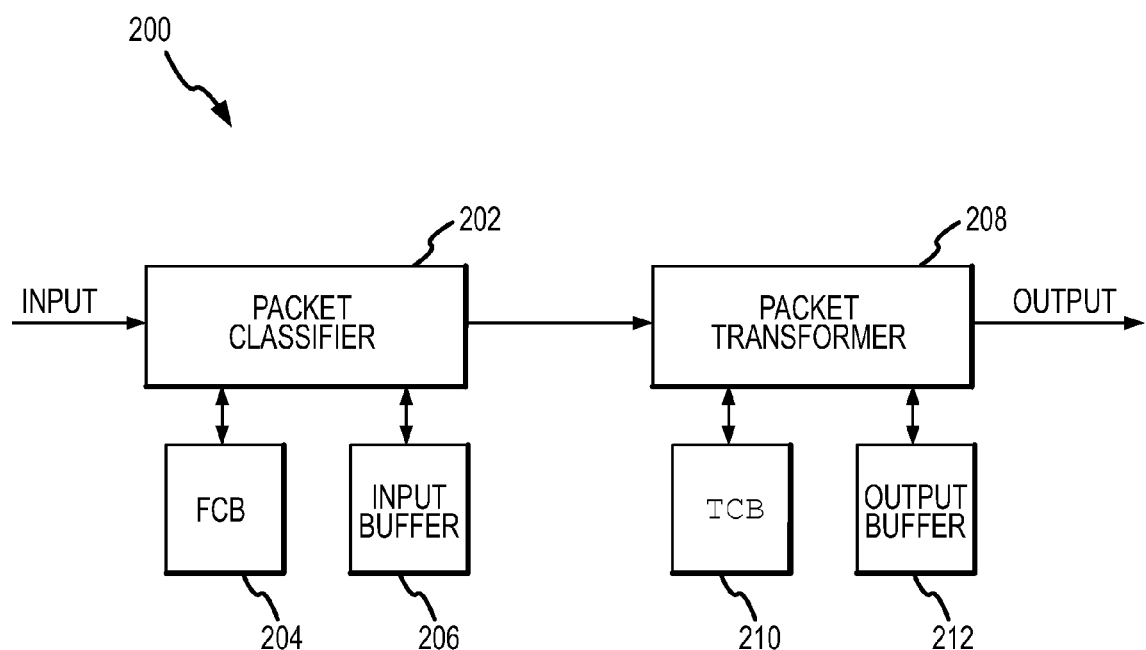
FIG. 2 is a functional block diagram of a packet multicasting system in accordance with an embodiment of the present invention.

FIG. 2 is a functional block diagram of a packet multicasting system in accordance with an embodiment of the present invention. Packet multicasting system 200 may be implemented by a virtual routing engine, such as one of VREs 104 (FIG. 1). System 200 may include packet-classifying system 202, which receives packets from a network and may classify a packet for multicasting in a certain routing context using flow classification block 204. Packet classifying system 202 may also buffer the received packets in input buffer 206. System 200 may also include packet-transforming system 208 which may receive the multicast packet and a first of a plurality of flow classification indices from packet classifying system 202 and may buffer the multicast packet in output buffer 212, which may be associated with the packet transformer. Packet transforming system 208 may identify first transform control instructions from the first flow classification index, and may transform the multicast packet in accordance with the first transform control instructions.

For next instances of multicasting the packet, packet classifying system 202 may send a next of the flow classification indices to packet transforming system 208 without the multicast packet, and packet transforming system 208 may identify next transform control instructions from the next of the flow classification indices. Packet transforming system 208 may also read the multicast packet from buffer 212, and transform the multicast packet in accordance with the next transform control instructions.

In one embodiment, the flow classification index may identify the packet as a multicast packet and accordingly, the packet can re-read from buffer 212 rather than be re-sent from packet classifier 208 for each instance of multicasting. This is described in more detail below. Although system 200 is illustrated as having several separate functional elements, one or more of the functional elements may be combined and may be implemented by combinations of software configured elements, such as processors including digital signal processors (DSPs), and/or other hardware elements. In embodiments of the present invention, at least a payload portion of a packet (e.g., a packet without all or portions of the header) may be buffered in input buffer 206, may be transferred to packet transforming system 208 and may be buffered in output buffer 212. In these embodiments, packet classifying system 202 may remove all or portions of the header during packet classification, and packet transforming system 208 may add all or portions of a new header during packet transformation.

Figure 3:
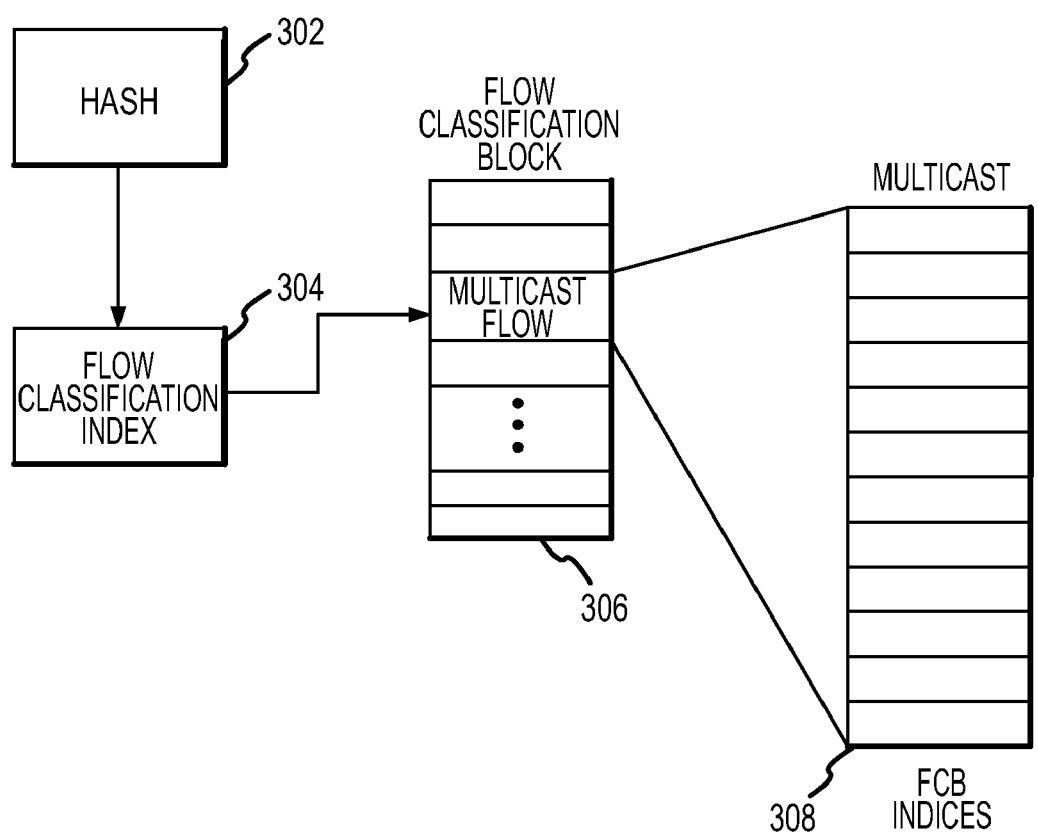
FIG. 3 illustrates the identification of flow classification indices for multicast packets in accordance with an embodiment of the present invention.

FIG. 3 illustrates the identification of flow classification indices for multicast packets in accordance with an embodiment of the present invention. When a packet is received at a routing system, such as system 200 (FIG. 2), hash 302 may be performed on a header portion of the packet to generate flow classification index 304 which may be used to locate a particular flow index of flow classification block (FCB) 304. FCB 304 may correspond with FCB 202 (FIG. 2). In the case of a multicast packet flow, the particular flow index of FCB 304 may point to array 308 of flow indices. Each flow index of array 308 may correspond with an instance of multicasting. In accordance with an embodiment of the present invention, one of the flow indices of array 308 may be provided to a packet transformer, such as packet transforming system 208, for use in transforming a buffered packet for multicasting. This is described in more detail below.

Figure 4:
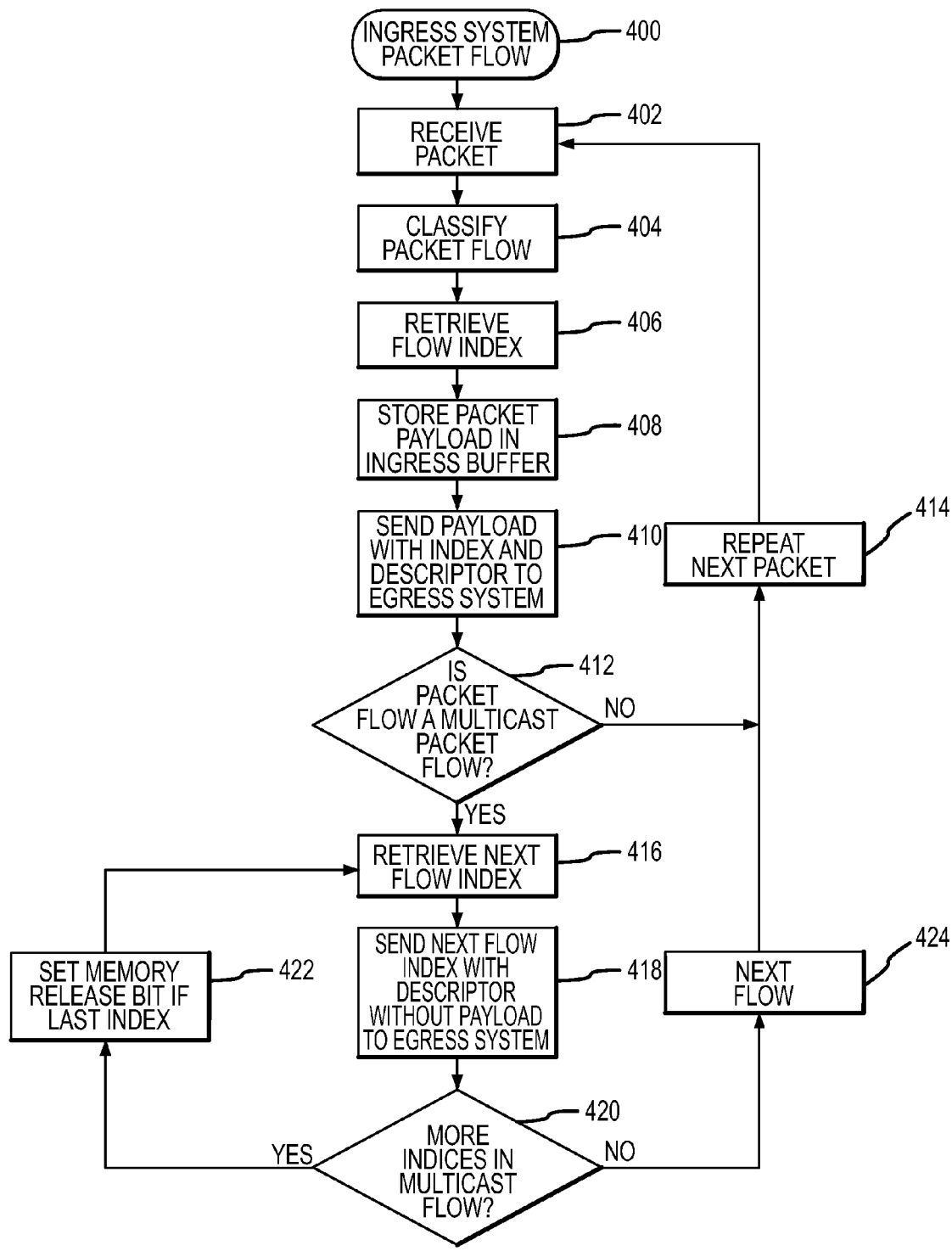
FIG. 4 is a flow chart of an ingress system packet flow procedure in accordance with an embodiment of the present invention.

FIG. 4 is a flow chart of an ingress system packet flow procedure in accordance with an embodiment of the present invention. Procedure 400 may be implemented by an ingress system, such as packet classifying system 202 (FIG. 2) although other systems may also be suitable. In operation 402, a packet is received and in operation 404, the packet flow may be classified. Operation 404 may classify the packet flow by performing a hash on header portions of the packet as illustrated in FIG. 3. In operation 406, a flow index is retrieved based on the packet flow classification of operation 404. In the case of a non-multicast packet flow (e.g., a unicast packet flow), one flow index may be identified and retrieved. In the case of a multicast packet flow, a plurality of flow indices may be identified, such as array 308 (FIG. 3). In operation 408, the received packet may be buffered in an input memory, such as input buffer 206 (FIG. 2). In operation 410, the packet along with the flow index may be sent to an egress system, such as packet transforming system 208 (FIG. 2). In the case of a multicast packet, operation 410 may send the packet along with a first flow index of the plurality of flow indices. A descriptor may be included to identify the flow as a multicast flow and instruct the egress system to re-read the same packet for subsequently received flow indices.

Operation 412 determines if the classified packet flow is a multicast packet flow or a unicast packet flow. When the packet flow is a unicast packet flow, operation 414 may repeat the performance of operations 402 through 412 for a subsequent packet. When the packet flow is a multicast packet flow, operation 416 is performed. In operation 416, the next flow index of the plurality of indices is retrieved and in operation 418, it is sent to the egress system. In one embodiment, a descriptor included with the next flow index indicates that the flow is a multicast flow instructing the egress system to use a previous packet. Operation 420 determines when there are more flow indices and operations 416 and 418 may be performed for each of the remaining indices. Operation 422 may set a memory release bit to allow the egress system to release the memory location where it has stored the multicast packet after receipt of the last flow index. In one embodiment, the memory release bit may be part of a descriptor, and in another embodiment, it may be a particular bit of the flow index sent in operation 418.

When there are no more flow indices of the plurality to be sent, each instance of packet multicasting has been provided to the egress system, and operation 424 may be performed for a next packet flow re-performing procedure 400. Although the individual operations of procedure 400 are illustrated and described as separate operations, one or more of the individual operations may be performed concurrently and nothing requires that the operations be performed in the order illustrated.

Figure 5:
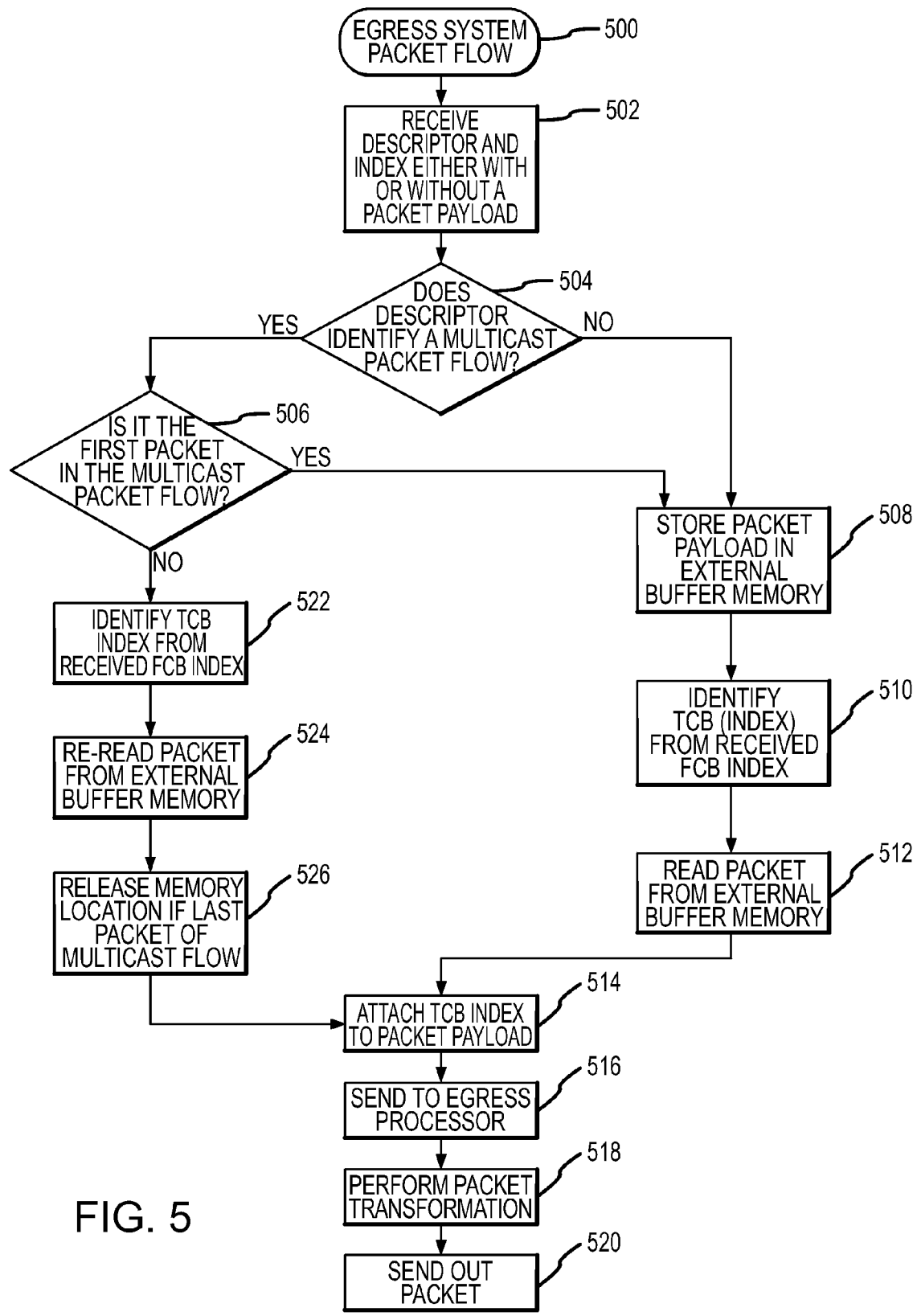
FIG. 5 is a flow chart of an egress system packet flow procedure in accordance with an embodiment of the present invention.

FIG. 5 is a flow chart of an egress system packet flow procedure in accordance with an embodiment of the present invention. Procedure 500 may be performed by an egress system such as packet transforming system 208 (FIG. 2) although other systems may also be suitable for performing procedure 500. In operation 502, a flow index may be received from an ingress system. The flow index may be received with a packet (e.g., at least the payload) or may be received without a packet. Flow indices received with a packet may be for packets having a unicast packet flow or may be a packet of a first instance of multicast packet flow. Flow indices received in operation 502 without a packet may be for subsequent instances of a multicast packet flow. In one embodiment, a descriptor may be received in operation 502 to indicate whether the flow is a multicast flow.

Operation 504 determines when the flow index is for a multicast packet flow. When operation 504 determines when the flow index is for a multicast packet flow, operation 506 is performed. Operation 506 determines whether the flow index is for a first instance of a multicast flow. When operation 506 determines that the flow index is for a first index of a multicast flow, or when operation 504 determines that the flow index is not for a multicast flow, operation 508 is performed. In operation 508, the received packet is buffered in memory, such as buffer 212. In operation 510, a transform index may be identified for the packet from the received flow index. In operation 512, the buffered packet may be read from the buffer, the transform index may be attached to the packet in operation 514. In operation 516, the transform index and packet are sent to a packet transform processor, such as an egress processor. In operation 518, the transform processor may perform a packet transform on the packet by using the transform index. In one embodiment, the transform index may identify a transform control block (TCB), such as TCB 210 (FIG. 2), which may be identified by the transform processor for performing packet transformation in operation 518. In operation 520, the transformed packet may be sent out for routing to a network.

In the case of a multicast packet flow wherein the packet is not received in operation 502, operations 522-526 are performed. Similar to operation 510, operation 522 identifies a transform index from the received flow index. In operation 522, similar to operation 512, the buffered packet is read from the buffer. In operation 526, the memory location where the multicast packet is stored may be released in the case of the last instance of the multicast flow. In one embodiment, a descriptor may be used to identify when to release the memory location. The descriptor may be part of the flow index received in operation 502.

Accordingly, for a multicast flow, a packet may be received only once (i.e., the first time) and stored only once (e.g., operation 508) and for subsequent instances of multicasting, the packet is re-read from a buffer. Although the individual operations of procedure 500 are illustrated and described as separate operations, one or more of the individual operations may be performed concurrently and nothing requires that the operations be performed in the order illustrated.

Figure 6:
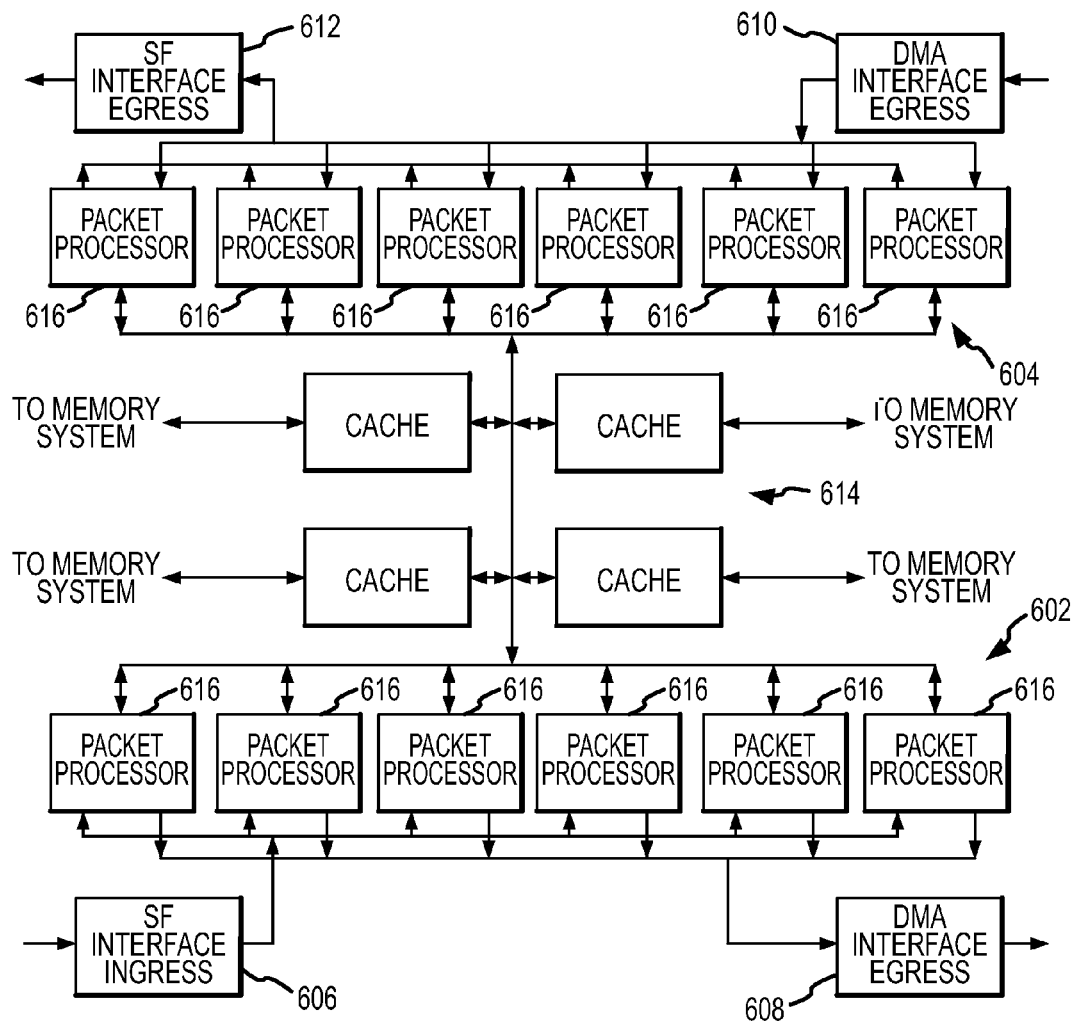
FIG. 6 is a functional block diagram of a packet-forwarding engine in accordance with an embodiment of the present invention.

FIG. 6 is a functional block diagram of a packet-forwarding engine in accordance with an embodiment of the present invention. Packet-forwarding engine (PFE) 600 may be suitable for use as system 200, although other systems may also be suitable. PFE 600 may provide hardware-assisted packet forwarding, and in one embodiment, PFE 600 may implement VR/VI-based forwarding of L3/L4 packet types including MPLS, IP, TCP/IP, UDP/IP and IPSec packet types. In some embodiments, PFE 600 may also implement flow cache and IP/MPLS route look-up forwarding modes, header insertion/replacement, MPLS header processing, including label push/pop and TTL decrement. In some embodiments, PFE 600 may also implement IP header processing including header validation, TTL decrement, DiffServ code-point marking, and header checksum adjustment. In some embodiments, PFE 600 may also implement TCP/IP Network Address Translation (NAT), ingress and egress rate limiting and ingress and egress statistics.

PFE 600 may operate in one of PEs 116 (FIG. 1) and may be logically situated between a switch fabric interface and a DMA engine of one of PEs 116 (FIG. 1). PFE 600 may be partitioned into ingress system 602 and egress system 604 as illustrated. Ingress system 602 may be suitable for use as packet classifier 202 (FIG. 2) and egress system 604 may be suitable for use as packet transformer 208 (FIG. 2). Ingress system 602 may process incoming packets received from the switch fabric ingress interface 606 and may transfer them to the DMA engine ingress 608. Egress system 604 may process outgoing packets from the DMA engine egress 610 and may transfer them to switch fabric egress interface 612. Both the ingress and egress systems may have direct access to a processing engines memory system.

In one embodiment, the micro-architecture of both PFE 600 ingress and egress units may include an array of packet processors 616 that may share an on-chip write-back cache 614. Each packet processor may operate on a different packet and hardware interlocks may maintain packet order. The ingress packet processors may share common micro-code for ingress processing and the egress packet processors may share common micro-code for egress processing. Memory of PFE 600 may map the ingress and egress instruction stores and supports micro-code updates through write transactions.

Ingress system 602 may pass forwarding state to the DMA engine, which may incorporate this state into the packet, receive descriptor. This forwarding state indicates whether the CPU should software forward the packet or the packet may bypass the CPU and PFE 600 can hardware forward the packet. The forwarding state also may include an index into a forwarding transform cache that describes PFE processing per packet micro-flow. For software forwarded packets, the receive descriptor may be pushed onto the DMA ingress descriptor queue. For hardware forwarded packets, including multicast packets, the descriptor may bypass the DMA ingress queue and be pushed directly onto the DMA egress descriptor queue as a transmit descriptor.

In an embodiment of the present invention, ingress system 602 may provide at least two basic forms of packet classification. One is flow-based, using various fields of the LQ header along with fields in the L3/L4 headers to identify a particular micro-flow in the context of a particular VR. The other form uses the upper bits of the IP address or MPLS label to index a table of flow indices. The host software controls which classification form PFE 600 uses by programming different micro-code into the ingress instruction store. In both forms, the classification result may be a forwarding index that the hardware uses to select the correct packet transformations.

In an embodiment of the present invention, each flow ID cache entry stores the LQ ID, LQ protocol, L3, and L4 fields that identify a particular VR micro-flow along with state indicating whether to hardware or software forward packets belonging to the micro-flow. Ingress system 602 generates an index (e.g., flow classification index 304 (FIG. 3)) into the flow ID cache (e.g., FCB 306 (FIG. 3)) by hashing the incoming packet's LQ ID, LQ protocol, L3, and L4 header fields. It then looks-up the indexed cache entry and compares the packet micro-flow ID fields to the cached micro-flow ID fields. On a cache hit, the FwdAction field of the cache entry indicates whether to software or hardware forward the packet. On a cache miss, the ingress controller allocates a cache entry and forwards the packet to software for flow learning.

In an embodiment of the present invention, when programmed for table lookup mode, PFE 600 classifies an IP packet by performing an IP destination address route look-up from the IP Prefix Table. In one embodiment, the IP Prefix Table may include a 16M entry first level IP prefix table indexed by the upper 24-bits of the IP destination address and some number of 256-entry IP prefix sub-tables indexed by the lower 8-bits of IP destination address. A prefix table entry may include either a transform cache index or a pointer to a prefix sub-table. The state of the table entry's Next Table field determines the format of the table entry. When the NextTable bit is set to '1', the bottom 31 bits of the entry indicate the address to the next-level table. When the NextTable bit is set to '0', the bottom bits of the entry indicate the forwarding index, and whether or not to send packets to software. The host software can steer packets with particular IP prefixes to the CPU by setting the Software Only field in the table leaf entries.

In an embodiment of the present invention, when programmed for table lookup mode and the protocol field of the ingress switch fabric header contains MPLS bit set, PFE 600 classifies a packet by performing a table lookup based on the packet's 20-bit MPLS label. In this embodiment, there may be two tables—one for when the MPLS BOS bit isn't set and one for when the MPLS BOS bit is set. Each of the table's 1M entries contains the 20-bit forwarding index, and a bit to direct packets to the CPU.

In an embodiment of the present invention, PFE 600 maintains a table of transform control blocks (TCBs), which direct how the egress controller may process outgoing-packets. The egress controller uses a forwarding index, carried by the DMA descriptor, to select a transform control block from the table before processing packets. To update a TCB, host software may send a control packet containing a message with an address parameter that points to the new TCB. Software may issue the TCB update control packet before issuing the packet being forwarded. This may ensure that the forwarded packet is processed according to the updated TCB.

In an embodiment of the present invention, some fields may be used to maintain packet order and associate the TCB with a specific flow. In flow mode where several new packets for a flow could be sent to the CPU there is a danger that once the CPU updates the TCB and FCB a packet could be hardware forwarded while the CPU still has packets for that flow. Packet order may be enforced by the TCB. When the TCB is written the DropCpuPkt bit should be zero, this may allow the CPU to send the NEW packets it has for that flow. However when the first FWD_HW packet is seen with this bit clear, the forward engine may update the TCB and set this bit. Subsequent packets from the CPU (recognized because they are marked FWD_HW_COH) may be dropped. There may also be a consistency check performed between the FCB and the TCB. On ingress the SF header SrcChan is replaced with the PendingTag field of the FCB, on egress the SrcChan is compared against the FCBTag field of the TCB. If the tags mismatch the packet is dropped. For prefix mode the SrcChan is replaced with zero, and the FCBTag field may be initialized to zero.

In an embodiment of the present invention, packet header transformation involves the replacement of some number of header bytes of an ingress packet with some number of bytes of replacement header data. Under the control of a TCB, egress system 604 may selectively replace and recompute specific fields in a small set of protocol headers. Egress system 604 begins the header transform by stripping the incoming packet's SF header along with the number of bytes indicated by the SF header offset field. At that point, the controller may begin copying bytes from the buffer pointed to by the TCB's HDRPTR field into the egress packet buffer. PFE 600 may copy the number of new header bytes defined by the TCB's HDRLEN field. After performing this header replacement, PFE 600 then goes through the TCB enable bits to determine what other header transformations need to be made.

Egress system 604 may perform a network address translation (NAT) for IP addresses and for TCP/UDP port addresses. When software enables IP or TCP/UDP NAT, it may also provide the associated replacement addresses and checksum adjustments in the corresponding TCB fields. When the hardware detects one of the NAT enable bits may be set to '1', it may replace both the source and destination addresses. If software intends to translate only the source address, it may still supply the correct destination address in the TCB replacement field. Similarly, the software may also supply the correct source address in the TCB replacement field when it is just replacing the destination address. A checksum adjustment may also be computed.

On the ingress side, layer two packets may be distinguished by bit five of the SF header protocol field being set. Microcode checks this bit and jumps to separate L2 header loading logic when it is set. Separate code-points for each L2/L3 protocol are defined in the SF spec, jumping to the proper parsing logic is done by using the entire SF protocol (including the L2 bit) field as an index into a jump table and jumping to that instruction which causes a jump to the proper code segment. One of the functions of the L2 parsing logic is to determine the size of the variable length L2 headers and increment the SF offset field by that amount (in some cases, such as de-tunneling 2.sup.nd pass) so that egress system 604 may strip off that part of the header. In addition the SF protocol field may be changed (also 2.sup.nd pass de-tunneling) to another protocol type depending what the underlying packet type is, this may also be determined by the parsing logic and causes the proper egress code path to be taken.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method for packet multicasting in a virtual routing system, the method comprising:

receiving a multicast packet at an ingress system of a packet-forwarding engine (PFE) of the virtual routing system, the virtual routing system including one or more virtual service engines (VSEs) and a flow manager configured to load balance service requests to the one or more VSEs;

the ingress system identifying a plurality of flow classification indices for the multicast packet;

for each instance of multicasting, the ingress system sending a single copy of the multicast packet and the plurality of flow classification indices to an egress system of the PFE;
buffering the single copy of the multicast packet in a memory accessible by the egress system; and
the egress system preparing the multicast packet for transmission by for each flow classification index of the plurality of flow classification indices, identifying corresponding transform control instructions based on the flow classification index, reading the single copy of the multicast packet from the memory, causing the multicast packet to be transformed in accordance with the identified transform control instructions and outputting the transformed multicast packet.

2. The method of claim 1, wherein causing the multicast packet to be transformed includes replacing at least one or more portions of a header of the multicast packet with one or more new portions, the one or more new portions being in accordance with the identified transform control instructions.

3. A system comprising:
one or more virtual service engines (VSEs);
a flow manager configured to load balance service requests to the one or more VSEs; and
one or more virtual routing engines (VREs) coupled to the one or more VSEs, each of the VREs including a packet classifier; and
a packet transformer; wherein,
the packet classifier is configured to receive multicast packets and for each of the received multicast packets, the packet classifier configured to identify a plurality of flow classification indices and configured for each instance of multicasting to send a single copy of the multicast packets and the identified plurality of flow classification indices to the packet transformer;
the packet transformer is configured to transform each of the multicast packets by operating on the single copy in accordance with one or more transform control instructions identified based on the identified plurality of flow classification indices.

4. The system of claim 3, further comprising a memory associated with the packet transformer and wherein the packet transformer buffers the single copy of the multicast packet in the memory after receipt of the single copy of the multicast packet from the packet classifier.

5. The system of claim 4, wherein the packet transformer replaces at least one or more portions of a header of the multicast packet with new portions, the new portions being in accordance with the identified transform control instructions.

6. The system of claim 5, wherein the system is a packet routing system and the transformed packets are provide to a network for routing in accordance with the replaced headers.

7. The system of claim 1, wherein the one or more VSEs provide firewall or antivirus services.

8. In a virtual routing system having a plurality of virtual routers (VRs) instantiated by a virtual routing engine (VRE), wherein the instantiation of each VR includes an associated routing context, a method of multicasting packets comprising:
determining one of the plurality of VRs for a packet received from a service provider for multicasting;
switching a routing context of the VRE to a routing context associated with the VR determined for the received packet;
reading at least a portion of the received packet from one of a plurality of multicast address spaces associated with the selected VR to multicast the received packet;
identifying a plurality of flow classification indices for the received packet;
sending the received packet and a first of the flow classification indices to a packet transformer;
buffering the received packet in a memory associated with the packet transformer;
identifying first transform control instructions from the first flow classification index; and
transforming the received packet in accordance with the first transform control instructions.

9. The method of claim 8, wherein the packet is a first packet received from a service provider for multicasting to a first multicast destination, and wherein a second packet is received from the service provider for multicasting, and the method comprises:
determining another one of the VRs for the second packet;
switching the routing context of the VRE to a routing context associated with the VR determined for the second packet;
reading at least a portion of the second packet from another of the plurality of multicast address spaces associated with the VR determined for the second packet to multicast the second packet; and
forwarding the second packet to second multicast destinations.

10. The method of claim 9, further comprising:
transforming headers of the first packet in accordance with transform control instructions of the routing context of the first packet; and
transforming headers of the second packet in accordance with transform control instructions of the routing context of the second packet.

11. The method of claim 10, wherein the first and second packets are received from a same service provider and have identical layer-two through layer-four (L2-L4) headers, and the method includes classifying the first and second packets in accordance with different VRs of the plurality of VRs.

12. The method of claim 8, wherein during reading, the packet is read from a same buffer for each instance of multicasting.

13. The method of claim 8, wherein selecting comprises classifying the received packet to determine one of the VRs having a routing context associated with the received packet.

14. The method of claim 8, wherein each VR of the plurality of VRs has a multicast address space associated therewith, and wherein switching the routing context of a VR includes switching a memory state of the VRE, and wherein the virtual routing system includes a plurality of VREs, each capable of instantiating a plurality of VRs.

15. The method of claim 8, further comprising:
sending a next of the flow classification indices without the received packet to the packet transformer; identifying next transform control instructions from the next of the flow classification indices; reading the multicast received packet from the memory;
transforming the packet in accordance with the next transform control instructions; and
repeating, for each of the flow classification indices of the plurality of flow classification indices, the sending the next flow classification index, the identifying the next transform control instructions, the reading and the transforming the received packet, to generate multicast packets for transmission.

16. The method of claim 15, wherein prior to transforming, the method further comprises providing the received packet with each next flow classification index of the plurality to an egress processor, and wherein transforming further comprises transforming the received packet by the egress processor in accordance with each next flow classification index, and wherein a packet classifier performs identifying the plurality of flow classification indices, sending the received packet and the first flow classification index, and sending each next flow classification index without the received packet, and wherein the packet transformer performs the buffering, the identifying the transform control instructions and providing the multicast received packet with each next flow classification index of the plurality of flow classification indices to the egress processor.

17. A non-transitory computer-readable storage medium tangibly embodying a set of instructions, which when executed by one or more processors of a virtual routing system, cause the one or more processors to perform a method comprising:

receiving a multicast packet at an ingress system of a packet-forwarding engine (PFE) of the virtual routing system, the virtual routing system including one or more virtual service engines (VSEs) and a flow manager configured to load balance service requests to the one or more VSEs;

the ingress system identifying a plurality of flow classification indices for the multicast packet;

for each instance of multicasting, the ingress system sending a single copy of the multicast packet and the plurality of flow classification indices to an egress system of the PFE;

buffering the single copy of the multicast packet in a memory accessible by the egress system; and the egress system preparing the multicast packet for transmission by, for each flow classification index of the plurality of flow classification indices, identifying corresponding transform control instructions based on the flow classification index, reading the single copy of the multicast packet from the memory, causing the multicast packet to be transformed in accordance with the identified transform control instructions and outputting the transformed multicast packet.

18. The non-transitory computer-readable storage medium of claim 17, wherein causing the multicast packet to be transformed includes replacing at least one or more portions of a header of the multicast packet with one or more new portions, the one or more new portions being in accordance with the identified transform control instructions.

* * * * *